G. W. HALL.
Grain-Drill.

No. 57,707. Patented Sept. 4, 1866.

Witnesses:

Inventor:
Geo. W. Hall
Per Munn & Co.
Attys.

UNITED STATES PATENT OFFICE.

GEO. W. HALL, OF AUGUSTA, MICHIGAN.

IMPROVEMENT IN COMBINED SOWER AND DRILL.

Specification forming part of Letters Patent No. 57,707, dated September 4, 1866.

*To all whom it may concern:*

Be it known that I, GEORGE W. HALL, of Augusta, Kalamazoo county, and State of Michigan, have invented a new and Improved Combined Sower and Drill; and I do hereby declare that the following is a full, clear, and exact description thereof, which will enable others skilled in the art to make and use the same, reference being had to the accompanying drawings, forming part of this specification.

The nature of my invention consists in constructing a machine so that by it grain, clover, and fertilizers may be sown and covered at the same time, or one at a time, as may be desired.

It more particularly consists in constructing pendent frames, in which are carried furrowing wheels and drills.

It also consists in the combination and arrangement of levers in such a manner that the same levers work the slides and agitators in the boxes at the same time.

It further consists in the peculiar and novel construction of the plows.

The machine is so constructed that the different parts may be detached and one used at a time, if desired.

To enable others skilled in the art to make and use my invention, I will proceed to describe its construction and operation.

Figure 1:
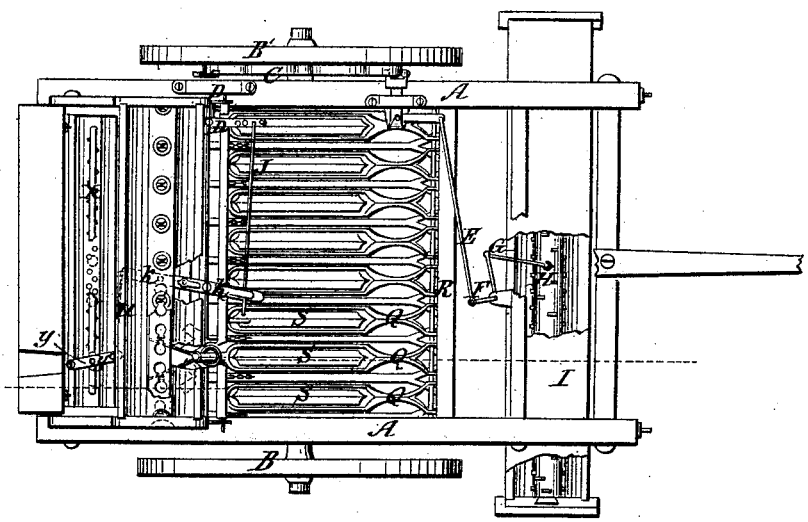
Figure 2:
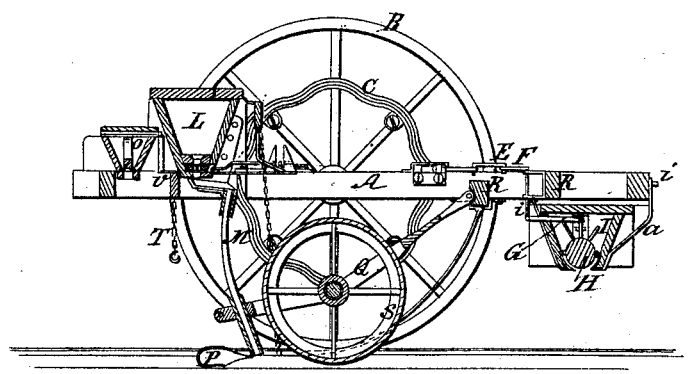
Figure 3:
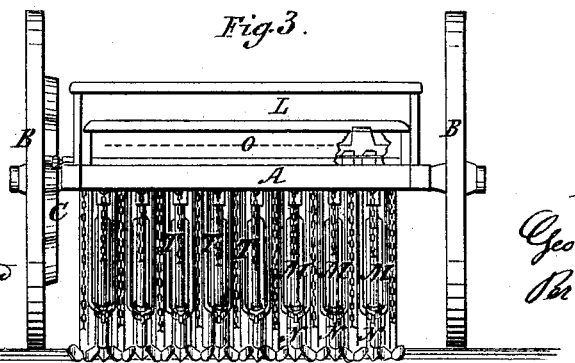

Figure 1 is a top plan view of my combined seeder. Fig. 2 is a side elevation of the same. Fig. 3 is a view, showing the rear of the machine.

Letters of like name and kind refer to like parts in each of the figures.

A is a rectangular frame, made of wood and mounted on wheels B B', which are of ordinary construction. Upon the wheel B' is an eccentric or cam, C, which is attached to the arms of the said wheel B'. Upon the cam C work two forked elbow-levers, D D', one at the front and rear secured to the frame A, and working nearly horizontal with the axis of the wheel B'.

At one end of the elbow-lever D' is connected the rod E, which connects with the lever F, which connects with the rod G, which is connected to the shaker H, which is located in the bottom of the hopper I, the top of which is partly broken out for the purpose of showing the shaker H.

To the elbow-lever D is connected a rod, J, that extends and is connected by a notch to the bar K, and attached to the slide in the bottom of the seed-box L, and the agitator in the bottom of hopper O.

L is a seed-box, located upon the frame A in rear of the wheels B B', in the bottom of which are provided suitable slides and openings, through which the seed flows through the tubes M M M into the pipes or drills N N N, and deposited upon the ground and into the furrows made by the wheels S S S, and covered by the plows P P P.

Q Q Q are pendent frames, in which the furrow-wheels run, the said frames being attached to the cross-timber R of the frame A and extend back so as to come nearly in line with the axis of the wheels B and B'. The plows are also attached to the cross-timber R of the frame A, and extend back between and to the rear of the wheels S.

It will be seen that these plows are of novel and peculiar construction, having double mold-boards, so that the furrow is turned each way into the furrow, into which the grain has been deposited, and which was made by the wheels S.

T T T are chains provided with hooks, so that the drill-tubes may be elevated when not in use. These said chains are suspended to the cross-timber U, Fig. 2, of the frame A.

It will also be seen that the hopper or box I is hung underneath the frame by means of straps *a a*, one at each end of the frame A, the said straps being provided with eyes at each end and hung upon hooks *i i*, which are attached to the main frame, so that the hopper I may be attached to the frame or detached, as desired.

A² is the tongue or pole to which the team is attached, and by which the machine is drawn. *b* is the driver's seat, which is secured by any well-known means to the lower end of the pole.

The operation in using the combined machine consists in putting the seed into the seed-box L and clover or other seed into the box O, and plaster or other fertilizer into the hopper I. The team is then attached to the machine, and as as it proceeds the traction-wheel B', through the medium of the cam C, puts in motion the elbow-levers D D', to which, as before described, are connected the rods E and J, which are also connected to the levers F, G, and K, which are connected and give motion to the agitators H and X, and the bar $k$ of the lever U and V, and the slides in the seed-box L, so that each part of the machine performs its functions regular, and in the most rapid, perfect, and satisfactory manner.

It will be understood that when only fertilizers are to be sown, by removing the lever or rod J from the connection it has with the lever K, that the action is cut off from the slides in the seed-box L, and the agitator X in the box O; and so when the plaster-hopper is not desired to be used it may be removed entirely from the machine by removing the straps $a\ a$ from the hooks $i\ i$, and so it can be replaced when desired.

Having thus described my invention, what I claim, and desire to secure by Letters Patent of the United States, is—

1. The pendent frames M carrying the furrowing-wheels S and drills N, for the purposes and substantially as described.

2. A machine for sowing different kinds of grain when provided with pendent frames carrying the furrowing-wheels and drill-tubes, substantially as and for the purposes herein set forth.

3. The combination and arrangement of the levers J, K, U, and V, connected to the slides in the seed-box L, and agitator X in the box O, with the elbow-lever D and cam $c$, all for the purposes and substantially as herein set forth.

4. The plows when constructed and operated as herein shown.

GEORGE W. HALL.

Witnesses:
C. W. COCK,
H. V. HOBART.